United States Patent

[11] 3,615,289

[72] Inventor Robert L. Felton
Clifton, N.J.
[21] Appl. No. 810,817
[22] Filed Mar. 26, 1969
[45] Patented Oct. 26, 1971
[73] Assignee Avon Products, Inc.
New York, N.Y.

[54] CANDLE COMPOSITION
8 Claims, No Drawings
[52] U.S. Cl. .................................................. 44/7.5,
431/288
[51] Int. Cl. .................................................. C10l 5/00
[50] Field of Search ..................................... 44/7.5;
431/288; 260/404.5

[56] References Cited
UNITED STATES PATENTS

| | | | |
|---|---|---|---|
| 1,959,164 | 5/1934 | Jaeger | 431/288 |
| 1,967,879 | 7/1934 | Geller | 431/288 X |
| 2,551,574 | 5/1951 | Fredericks | 44/7.5 |
| 3,194,031 | 7/1965 | Gorman, Jr. | 44/7.5 |
| 3,297,730 | 1/1967 | Fischer | 260/404.5 |

Primary Examiner—Daniel E. Wyman
Assistant Examiner—C. F. Dees
Attorney—Pennie, Edmonds, Morton, Taylor and Adams ABSTRACT: Candle compositions which may be transparent or pastel shaded and which are adapted to incorporate perfumes without flashing during burning, such compositions comprising as the basic components a mixture of (a) a thermoplastic polyamide resin formed from linoleic acid polymerized with a polyamine compound, (b) an alkanol amide or alkanol amine and (c) a stearic acid compound.

CANDLE COMPOSITION

This invention relates to a candle composition and construction, and it particularly relates to candles which may be transparent, translucent or of pastel shades, which may be provided with interior designs or other decor, and which may incorporate perfumes which will give off a pleasant odor or essence, while burning, without any danger of flashing.

Although candles are now most often used for decorative effect, it has, heretofore, not been possible to obtain an effectively burning candle which may be transparent or pastel in shade so that interior decor may be molded thereinto. It has also not, heretofore, been possible to obtain a candle which can effectively incorporate perfumes without flashing during burning.

All this can now achieved in accordance with the present invention wherein the composition of the candle comprises about 15 to 35 percent by weight of a solid gel thermoplastic polymer, and, more particularly, a solid polyamide resin which is the soluble condensation product of an aliphatic dicarboxylic acid and a diamine, the carboxyl and amino groups of adjacent mono units being condensed to an amide linkage in the polymer. The resin may also be based on carboxylic and amine compounds having more than two carboxyl and amino groups respectively. The resin is composed primarily of polyamides of molecular weight or weights within the range of from about 2,000 to about 10,000 but may be blended with similar polyamides of lower molecular weights. These resins are of the general type set forth in U.S. Pat. No. 2,450,940 and are commercially available under such tradenames as "Versamid" (A product of General Mills, Inc.).

The "Versamid" polyamide resins, which may be more simply identified as thermoplastic condensation products of polymerized linoleic acid with various polyamine compounds such as ethylene diamine, diethylene triamine, etc., are commercially available in various degrees of hardness or flexibility, and identified as to such properties by number such as "Versamid 900," "Versamid 930," "Versamid 940," "Versamid 948," "Versamid 950," etc. For purposes of the present invention, when a clear transparent, translucent or pastel shade is desired, it it preferred to use "Versamid 1635," which is prepared from a fully hydrogenated dimer. However, the other "Versamids" may be used for colored candles of deeper shade.

Another substance required in the composition consists of about 20 to 55 percent by weight of an alkanol amine or alkanol amide prepared by the reaction of a fatty acid ester and an amine wherein the ester and the amine are in substantially equal proportions. Among such compounds are the 181 and 2:1 (Kritchevsky type)diethanolamides of fatty acids, the 1:1 proportion being preferred. These preferred alkanol amides are of the oily, nondetergent type, and are used as extenders to increase the plasticity and moldability of the composition. The preferred chain length of the fatty acid component is about 14 to 24 carbon atoms. Examples are "Barlol 12C2" (Barid Chem. Co.), a monoalkyl diethanolamine having eight to 18 carbon atoms in the alkyl chain, "Schercomid CDAH," a diethanolamide of coconut fatty acid, "Monamine ADD 100," a full coconut oil alkanolamine condensate having some free amine, and "Gafamide CDD 518," a coconut acid diethanolamine condensate.

The alkanol amide or alkanol amine and polyamide resin should preferably be present in a respective proportion of between about 2:1 and 3:2 parts by weight relative to each other.

A third important component comprises one or more stearic acid esters or a mixture of stearic acid esters and stearic acid. These esters, include such compounds as isopropyl isostearate, butyl stearate, hexadecyl stearate, etc. These stearic acid compounds serve as stabilizing agents which permit the ready incorporation of most ordinary perfume oils at concentrations up to about 2 percent by weight of the composition. They are carriers for the perfume and may be used in a proportion of between 1 to 50 percent by weight of the composition, although the preferable range is between about 20 to 30 percent. In this connection, it is possible to use up to about 5 percent by weight of perfume if part of the formula is replaced by a product sold by the Neville Chemical Co. under the trade name "Nevex 100," this product being a light colored coumarone-indene copolymer resin of very little unsaturation. This "Nevex 100" may be used in a proportion of about 5 to 7 percent of the composition.

In addition to the above components, other components may optionally be used for specific purposes. One such component is a polyamide resin that is similar to the "Versamids" except that it is a reactive type resin that has at least some free carboxylic groups. A product of this type is manufactured by General Mills under the trade name TPX–64. This component may be present in a proportion of from about 5 to 10 percent by weight of the composition, and acts to prevent "sweating" by inhibiting the migration of the oily components. It also provides a smoother, glossier finish.

Another optional component may be a nonionic surface active agent, especially one of those comprising fatty acid partial esters of hexitol anhydrides or derivatives thereof, such as "Span 60" and "Tween 60" (both produced by Atlas Powder Co.). These nonionics act as dispersing and emulsifying agents and prevent "blooming" or fogging of the compositions which would result in opaqueness. They are especially desirable, therefore, where it is required to have a clear or transparent candle. They are preferably used in the range of between about 0.2 and about 0.8 percent by weight of the composition.

Another optional component, which is used in the proportion of about 0.2 to 1.5 percent by weight, preferably 0.5 to 1.0 percent by weight, is one which provides dryness and resistance against moisture cycles in the atmosphere. This is often important in the manufacture of the candles where the components are required to be melted in order to be cast or molded. It also permits the reuse of scraps cut from the finished candles, these scraps being melted down and then recast or remolded. A particular product which is preferred for this purpose is an alkyl dimethyl amine oxide, containing 65 percent by weight $C_{12}$, 25 percent $C_{14}$ and 10 percent $C_{16}$, in 30 percent aqueous solution. Such product is sold under the trade name "Barlox 12" by Baird Chemical Co. A similar product is "Barlox E12C," which is the oxide of "Barlol 12C2."

Another optional component is an alcohol. This alcohol, which may be present in about 0.1 to 1.0 percent by weight of the composition, may be a lower aliphatic alcohol such as ethanol, esopropanol, etc., or an alkylated aryl polyether alcohol. An example of the latter is "Triton X–100" (Rohm & Haas) which is a water-soluble isooctyl phenoxy polyethoxy ethanol. These alcohols are used as antifoam agents and to provide a trace of moisture.

Other additives may, in some instances, include coupling agents such as isostearic acid, fuels, and glossing agents such as isopropyl myristate, isopropyl palmitate, etc., paraffins in small quantities, dimer acids, etc.

The following table embodies nine different examples, each with a different formulation as indicated. In each example, the Versamid is mixed with the"Barlol" and the mixture is heated, under gentle agitation, at a temperature of about 100–115° C. until the mixture is clear. In those instances where the "TPX–64" is used, it is also added to the mixture at this point.

After a period of about one-half to 1 hour, or immediately after the above mixture is clear, the stearate (or stearate "Nevex 100" component is added, with agitation and while the same temperature is maintained. Then, without further heating, all the other components except the amine oxide component is added, with agitation. Thereafter the amine oxide is added, still with agitation. The mixture is then poured, while hot, into a mold, where it cools and solidifies to form the product.

Formulae (% by weight)

| Ingredients | No. 1 | No. 2 | No. 3 | No. 4 | No. 5 | No. 6 | No. 7 | No. 8 | No. 9 |
|---|---|---|---|---|---|---|---|---|---|
| Versamid XR-1635 | 29 | 25 | 25 | 30 | 28.5 | 34 | 26 | 20 | 24 |
| Barlol 12C2 | 43 | 37 | 38 | 45 | 40 | 51 | 39 | 45 | 45 |
| Hexadecyl Stearate | 24 | | 20 | 20 | | | | | |
| Butyl Stearate | | | | | 25 | 3.5 | 30 | | 23 |
| Nevex 100 | | 4 | 7 | | | 5 | | 6 | |
| Barlox 12 | | | | | | | 1 | 0.3 | 0.2 |
| Barlox E12C | | | | | 1.5 | 1.5 | | | |
| Span 60 | | | | | | | 0.4 | 0.6 | 0.4 |
| Tween 60 | | | | | | | 0.4 | 0.4 | 0.4 |
| Perfume | | 2 | 2 | 1.5 | 1 | 1.5 | 1.2 | 3 | 1 |
| TPX-64 | | | | | | | | 10 | 6 |
| Isopropyl Isostearate | | | | | 4 | | | 14.5 | |
| Isostearic Acid | 4 | 15.5 | 8 | 3.5 | | 3.5 | 2 | | |
| Isopropyl Myristate | | 16.5 | | | | | | | |
| Isopropanol 99% | | | | | | | | | 0.2 |

The above compositions are adapted to be molded into freestanding candles or they may be poured into a container and hardened therein to form an integral unit.

The molding of these candles is accomplished by placing a wick of any standard type in position within the mold and then pouring the composition around it. The pour temperature will vary widely in accordance with the melting points and viscosities of the particular components.

If decorative inserts are used, they are placed in the mold together with the wick, prior to pouring of the composition. If particular colors are desired, any feasible pigment or dye which is compatible with the composition and will not cause flashing may be added to the composition.

Although any standard type mold can be used, it is preferable that it have slight flexibility and smooth, unpitted surfaces. If desired, the mold can be made of any decorative shape.

The invention claimed is:

1. A candle composition comprising (a) a thermoplastic polyamide resin formed from linoleic acid polymerized with a polyamine, (b) an alkanol amide or alkanol amine said alkanol amide being the reaction product of a fatty acid ester and an amine or a fatty acid and an amine, and (c) a stearic acid ester, the polyamide resin and the alkanol amide being in a respective proportion to each other of between about 1:2 and 2:3 parts by weight, the alkanol amide being present in about 20 to 55 percent by weight of the composition, and the stearic acid ester being present in a proportion of about 1 to 50 percent by weight of the composition.

2. The composition of claim 1 wherein the stearic acid ester is present in a proportion of about 20 to 30 percent by weight of the composition.

3. The composition of claim 1 wherein 5 to 7 percent of the composition is replaced by a coumarone-indene copolymer resin.

4. The composition of claim 1 and including about 0.2 to 1.5 percent by weight of an alkyl amine oxide.

5. The composition of claim 1 and including about 0.1 to 1.0 percent by weight of an alcohol selected from the group consisting of lower aliphatic alcohols and alkylated aryl polyether alcohols.

6. The composition of claim 1 in molded form and having a protruding wick embedded therein to form a candle.

7. The composition of claim 1 in molded form and having a protruding wick embedded therein as well as inserts embedded therein to form an internal decor.

8. A transparent candle comprising a molded composition having a protruding wick embedded therein, said molded composition consisting essentially of (a) a thermoplastic polyamide resin formed from linoleic acid polymerized with a polyamine, (b) an alkanol amide, said alkanol amide being the reaction product of a fatty acid ester and an amine or a fatty acid and an amine, and (c) a stearic acid ester, the polyamide resin and the alkanol amide being in a respective proportion to each other of between about 1:2 and 2:3 parts by weight, the stearic acid ester being present in a proportion of about 1 to 50 percent by weight of the composition.

* * * * *

PO-1050
(5/69)

UNITED STATES PATENT OFFICE
CERTIFICATE OF CORRECTION

Patent No. 3,615,289                    Dated October 26, 1971

Inventor(s) Robert L. Felton

It is certified that error appears in the above-identified patent and that said Letters Patent are hereby corrected as shown below:

Column 1, line 15, after "now" insert -- be --.

Column 1, line 41, "it" (second occurrence) should be -- is --.

Column 1, line 49, "181" should be -- 1:1 --.

Column 1, line 53, the "," should be -- . --.

Signed and sealed this 21st day of March 1972.

(SEAL)
Attest:

EDWARD M. FLETCHER, JR.    ROBERT GOTTSCHALK
Attesting Officer    Commissioner of Patents